Patented Aug. 18, 1942

2,293,385

UNITED STATES PATENT OFFICE 2,293,385

CASEIN PRODUCT AND PROCESS OF MAKING

Henry V. Dunham, Bainbridge, N. Y., assignor to The Borden Company, New York, N. Y., a corporation of New Jersey No Drawing. Application May 13, 1940, Serial No. 334,904

8 Claims. (Cl. 260—120)

Casein is ordinarily prepared from skim milk, by one of two processes, namely the acid process and the rennet process. The acid process involves the addition of acid to the skim milk, or allowing acid to develop in said milk by lactic fermentation, until the major part at least of the casein in the milk has been precipitated in the form of a curd, the curd separated by decantation or similar operation and the acid casein washed once or several times with water, and the casein dried and ground to the desired mesh size. The casein produced by this process is commonly referred to in the industry as "acid casein." In the rennet process, the material rennet is added to the milk, which causes a precipitation or curdling and after the bulk of the casein has been thrown down, the rennet casein is washed and dried as indicated above.

Acid casein has long been recognized as being substantially different from rennet casein, and these two types of caseins are used for different purposes in the industry. Acid casein is readily soluble in solutions of mild alkali such as sodium bicarbonate, borax and the like, and acid casein usually contains only a small percentage of ash, such as 1.5 to 3% and acid casein is the type of casein ordinarily used in the making of casein glues, sizings, calcimine, and any compositions which are to be dissolved.

Rennet casein is not readily soluble in mild alkali solutions as indicated above, although it is possible to dissolve rennet casein, to some extent, in a few kinds of relatively strong alkalies, but the solutions of rennet casein heretofore produced have not been usually satisfactory. Rennet casein accordingly is not commonly used in the making of casein solutions, but is used in making casein plastics, and this latter use is the principal use of rennet casein in the industrial arts. Rennet casein usually has a high ash content such as 7 to 9%, the ash apparently consisting of a large part of the mineral salts which were in the milk treated.

All casein solutions of the prior art, have been decidedly turbid and cloudy and not transparent. Casein solutions are not necessarily wholly opaque, but may be more or less translucent, but they cannot be made transparent by filtration in filter presses, and casein solutions cannot be made transparent by filtration through filter paper, the filter paper very soon being clogged up by the finely divided insoluble constituents of the solution. The dilute solution, filtered, is translucent. Due to these facts, really clear and transparent solutions of casein are unknown, in the prior art.

I have now found, after experimenting with a great number of solvents which are well known to dissolve acid casein, and some which do not appear to have heretofore been proposed as solvents for acid casein, that rennet casein dissolves readily in aqueous solutions of tetra-sodium-pyrophosphate, and it is readily possible, according to my researches, to produce from rennet casein (also called para-casein) solutions which are substantially water-clear and substantially transparent. While acid casein is also soluble in tetra-sodium pyrophosphate, I have not been able to produce solutions of acid casein of as good clarity and transparency, in said solvent. It is regarded as highly unexpected, that rennet casein, long known to be not readily soluble in ordinary casein solvents, should be capable of giving a highly transparent solution. This is because of the well known fact in the industry that while acid casein may be dissolved in aqueous solutions of borax, sodium or potassium phosphate, soda ash, sodium bicarbonate, ammonia and numerous others, rennet casein is only partially soluble or insoluble in such solvents, and the rennet casein solutions heretofore prepared have been usually incomplete and particularly turbid and cloudy. It is of course well recognized that turbidity and cloudiness and partial opacity of solutions are often objectionable in the use of such solutions in the art. A particular use in which such properties are highly disadvantageous is the finishing of leathers, which turbidity of casein solutions imparts a dull and grayish appearance to the surface of the finished leather. These properties are also objectionable in coating papers, particularly delicately colored paper or paper coated with pigment material of delicate colors. This has, in many cases, rendered it necessary to use other adhesive agents instead of casein, in coating some kinds of leather and paper, where a clear and bright surface was desired.

One object of the present invention is to dissolve paracasein in the presence of water with the aid of a selected solvent. Another object is to prepare a water clear casein solution or compound. A further object is to prepare a dry paracasein compound which when mixed in water and dissolved, will produce a water clear or substantially water clear solution. A still further object is to prepare a paracasein compound which will dissolve with the required amount of any of the usual casein solvents in the presence of water and produce a clear or substantially clear casein solution. A further object of the invention is to provide a novel solvent for rennet casein and for acid casein. Further objects of the invention will be apparent from the following disclosures.

I have found that when paracasein of the usual commercial quality is suspended in water and the required amount (e. g. 20%) of normal sodium pyrophosphate (i. e. tetra-sodium pyrophosphate) is added, a clear solution can be obtained with or without the aid of heat. This solution may be obtained with the dried commercial paracasein or one may use the freshly precipitated paracasein without drying the same. In either case if the resulting solution is of sufficient dilution, it will be noted that an extremely fine precipitate (or insoluble residue, apparently of mineral matter) settles out, while the remaining liquid suspension may still remain quite opaque. If the fine, white precipitate which is settled out, is removed from the solution, and some of this precipitate is thoroughly washed a number of times with cold or hot water, thereafter dried, it will be found that it contains only a little (probably about 2%) entrained protein and about 98% ash, presumably, largely a form of calcium phosphate. If the somewhat opaque paracasein solution remaining after having removed the precipitate, is treated with any weak acid in order to precipitate the casein from the solution, thereafter thoroughly washed and dried, the ash content of the casein will be low (e. g. approximately 1.39%). The paracasein here used had 7.85% ash.

If the paracasein solution, preferably from which the major portion of precipitate has been allowed to settle and removed therefrom, is treated with freshly precipitated aluminum hydrate and for ease of filtrating, preferably with a small amount of a filtration assistant such as infusorial earth or the like, the filtered paracasein solution resulting, is water clear. The resulting water-clear solution may be dried by means of a spray drier, a roller drier or any other suitable means, and the dry product resulting, is soluble in water, giving a substantially clear solution. This solution possesses the property of excessive foam development when a solution of same is beaten or whipped and may be useful in various food industries as a substitute for egg albumen. If desired, the filtered clear solution may be partially neutralized with a weak acid or acid salt prior to drying. Furthermore, the clear solution may be completely precipitated by means of an acid or an acid salt, the resulting precipitate allowed to separate from the excess water, washed, dried and ground.

By following such a process the dried material has the same physical appearance of any regular type of acid casein. However, when placed in water with a sufficient amount of the usual casein solvents, the parcasein compound dissolves and a water-clear or a substantially water-clear solution is obtained.

In order to more fully describe this invention I give the following by way of examples but without in any way limiting the scope of the invention.

EXAMPLE I.—Into a suitable mixer with an agitator preferably running about 60 R. P. M., I placed 200 lbs. of cold water. Thereafter, I add 50 lbs. of paracasein ground to a suitable mesh, for example all passing through 24 mesh wire screen. The paracasein used contained 10.93% moisture and 7.85% ash (in the air-dry state). The casein is agitated in the water e. g. for about half an hour, in order to soften the particles, and thereafter I add 2½ lbs. of normal sodium pyrophosphate, continue the mixing while heating to 160° F. for 30 minutes; thereafter I add 7½ lbs. more of the normal sodium pyrophosphate. Continue the mixing and raise the temperature to 180° F. Thereafter, add 300 lbs. of additional water, which may be at 180° F., or cold water, from the tap, can be used. Then continue the stirring, while raising the temperature to 180° F. e. g. by blowing in steam. Then well mix for a few minutes longer and discontinue the stirring. Then allow the solution to stand (preferably while cooling to room temperature) in order to permit the sedimentation of the developed, finely divided mineral precipitate. The pH of the solution was about 9.5. The solution may be allowed to stand several hours or over night or at least until it has been determined that the mineral precipitate developed, has largely settled to the bottom of the vat. Thereafter, the supernatant liquid is drawn off from the tank as well as possible, leaving the mineral precipitate in a settled condition and of course with a certain amount of the paracasein solution contaminated with it. Into the solution so drawn off, is then mixed 2½ lbs. of aluminum hydrate paste, (that is, an aluminum hydroxide which has never been allowed to dry out, and the 2½ lbs. being calculated on the dry weight content of the aluminum hydroxide). After thorough mixing there is preferably also added 2½ lbs. of some filtration assistant medium such as a good grade of infusorial earth or the like. The resulting mixture is thereafter filtered through a filter press resulting in a water clear solution of the paracasein coming through the filter press, the insoluble filter medium, aluminum hydrate and insoluble impurities remaining on the filter plate. The clear paracasein solution may now be dried to a powdery condition, on a drum drier or the like, either as it comes from the filter press or after partially neutralizing the clear solution to any desired degree with a weak acid, or the clear solution may be precipitated to completion by the addition of any desirable acid (e. g. sulphuric, hydrochloric, lactic, etc.) following in general the procedure used in precipitating casein from skim milk. The precipitated casein was then dried.

A run was made, following the details of Example I, and in this said run, tap water having a slight amount of color was used.

The paracasein solution coming from the filter press (in the said run), before drying, was substantially water-clear and transparent. Thus it was readily possible to read ordinary newspaper printing through a layer of this, 10 inches in thickness. The solution, coming from the filter press, was nearly water-white in color, although it had a very slight yellowish cast, not noticeably stronger in color than the original tap water used in the process, which was Bainbridge town water.

It is contemplated to carry out the process of this invention, in commercial practice, in equipment made of stainless steel, while using water which is free from color.

The precipitated casein (in said run), precipitated, from this filtrate, (without drying and also after drying) dissolved in aqueous alkali solution, likewise gave nearly water-white transparent solutions.

Small tests made in the laboratory, in glass and porcelain receptacles throughout, and using distilled water, and in which the solution was filtered through paper filters, gave what seemed to be perfectly water-white clear filtrates.

*Test A.*—This clarity and low degree of color, is very striking. I give the following, for comparison. A very pure high grade commercial acid casein (I believe the purest commercial acid casein obtainable on the American market) was used in comparison.

A solution was made from 100 parts of this casein, 15 parts of borax and 500 parts of water, well mixed while being heated to 140° F. Some of this solution was placed in a flat bottomed clear glass dish. Even with a layer of the solution 1/8 inch thick, it was not possible to read ordinary newspaper printing. It was in fact not possible to distinguish any of the letters, on the printed page, when the dish with said 1/8 inch layer of the casein solution was over the printed page.

*Test B.*—In comparison with the above, a similar solution, of 100 parts of the dried precipitated casein made by Example I, was dissolved, using 15 parts of borax and 500 of water. In other words this solution was precisely like the one made in Test A, but the "clear casein" made in Example I was substituted for the high grade acid casein.

Into the dish used in Test A (after washing and drying) was poured some of the solution prepared in the preceding paragraph. When the solution was 1.5 inches in thickness, the newspaper printing could be clearly read, through this thickness of solution. When the depth of this solution was increased to 2 inches, it was still possible, using care, to read said print, although the printing was somewhat blurred.

Thus a 2 inch layer of the treated rennet casein solution was much more transparent than a 1/8 inch layer of the high grade acid casein solution.

Although these two tests may be considered as rather crude, and were made with make-shift equipment, they can be regarded as being strictly comparative tests.

EXAMPLE II.—Same as Example I, but the 10 lbs. of tetra-sodium pyrophosphate were added at once, after heating the casein and water mixture to about 160° F. Results same as in Example I.

Samples of the filtrate from the filter press, in the above examples were dried in various ways, giving similar products.

(1) Some of the clear solution of the paracasein product, dried on the usual roller type milk drier, was added to water on the basis of 100 parts, by weight, of the dried soluble paracasein product to 600 parts of water. The resulting solution was violently agitated for a few minutes and developed a very pronounced foam, very similar in appearance to beaten egg white. It remained in this foamy consistency over a period of several hours with only a small part of the foam breaking down to the liquid state.

(2) Some of the clear solution was spray dried, giving a similar soluble product.

(3) Some of the clear paracasein solution was precipitated with an acid, washed, dried and ground, was dissolved with various casein solvents including borax, trisodium phosphate, ammonia and triethanolamine. The method for dissolving consisted in placing 500 parts of water in a receptacle, adding 100 parts of the precipitated paracasein material, stirring to wet the particles, thereafter, adding the alkaline reagent, mixing and heating with slow stirring, to 140 or 150° F. The resulting solution possesses good flowing properties, remains practically water-clear and requires approximately the same amount of alkaline reagents to dissolve the paracasein material as is required when dissolving a good grade of acid casein.

Many tests were made to determine whether solutions of rennet casein could be made, using water and various other compounds of an oxygen acid of phosphorus with alkali metals. The following gave solutions, but only the last mentioned gave the water-clear solution.

| | | |
|---|---|---|
| $K_2HPO_4$ | 25.2 | 7.35 |
| $K_3PO_4$ | 40 | 11.4 |
| $K_4P_2O_7$ | 24.8 | 8.4 |
| $Na_2HPO_4$ | 54 | 7.1 |
| $Na_3PO_4$ | 24.6 | 10.1 |
| $Na_2H_2P_2O_7$ | 16.7 | 5.3 |
| $NaH_2PO_2$ | 16 | 6.2 (partial solution only) |
| $Na_4P_2O_7$ | 22 | 8.5 |

In the above table, the first column gives the salts used (with water). The second column gives the amount of the particular salt, to 100 grams of the dry rennet casein, and the third column gives the pH of the solution (or mixture in next to the last case, in which solution was far from complete).

Only in the last case (i. e. with $Na_4P_2O_7$) was the fine precipitate (apparently consisting principally of tricalcium phosphate) produced on standing.

In all the tests noted in this table, the mode of the treatment was like the first part of Example I.

From the above table and explanation, it will be obvious that the action of tetra-sodium pyrophosphate is unique and substantially different from the action of the other salts mentioned.

In place of filtering, after adding the filter aid, the liquor could be clarified by centrifugal treatment.

In both Example I and Example II, the amount of the sodium pryophosphate used in dissolving the rennet casein, was 20%, based on the amount of the casein. This appears to be about the preferred amount, but the invention is not limited to this amount.

In some tests, one-half this quantity was used, but the precipitation and/or settlement of the fine precipitate (probably $Ca_3(PO_4)_2$ more or less pure) was not as complete, and the precipitate was more flocculent, and settled much more slowly.

When 15% of the pyrophosphate was used, the results were better than when using 10%, but not as good as when using 20%.

When 20% of the sodium pyrophosphate is used (or 10% or 15% of this) in a similar treatment of a good grade of acid casein, solution occurs, but there is no precipitate produced nor settled out (or only very little), and no clarification of the solution occurs. In other words, the solution of acid casein in the tetrasodium pyrophosphate solution behaves (so far as opacity is concerned) about like any other solution of acid casein in an alkaline solvent. But such a solution is novel and is a part of the present invention.

In the present process (when rennet casein is used), prior to the filter-pressing, I have shown the addition of aluminum hydrate paste. This is extremely helpful in getting good clarity, in fact better, judged from results to date, than other clarifying agents.

I claim:

1. A solution of rennet casein in a solvent which consists essentially of an aqueous solution of tetra-sodium pyrophosphate.

2. A solution of rennet casein in an alkaline pyrophosphate solution of the type $M_4P_2O_7$ in which M is an alkali metal, which casein solution is substantially free from the turbidity and cloudiness commonly exhibited by solutions of acid casein in aqueous alkali solutions.

3. In the art of producing solutions of casein, the step of dissolving rennet casein in a solvent which consists essentially of an aqueous solution of tetra-sodium pyrophosphate.

4. In the art of producing solutions of casein, the step of dissolving rennet casein in a solvent which consists essentially of an aqueous solution of tetra-sodium pyrophosphate, allowing insoluble mineral matter to settle and separating the substantially clear solution from mineral matter insoluble in the solution.

5. In the art of producing solutions of casein, the step of dissolving rennet casein in a solvent which consists essentially of an aqueous solution of tetra-sodium pyrophosphate and separating the substantially clear solution from mineral matter insoluble in the solution.

6. A process which comprises dissolving rennet casein in a solvent consisting of an aqueous solution of tetra-sodium pyrophosphate, and allowing the solution to stand until a fine precipitate has settled out, adding a filtering aid to the solution and separating the clear liquor from the bulk of the insoluble matter.

7. A process which comprises dissolving rennet casein in a solvent consisting essentially of an aqueous solution of tetra-sodium pyrophosphate, and allowing the solution to stand until a fine precipitate has settled out, adding a filtering aid to the solution, separating the clear liquor from the bulk of the insoluble matter and drying the solution.

8. A process which comprises dissolving rennet casein in a solvent consisting essentially of an aqueous solution of tetra-sodium pyrophosphate, and allowing the solution to stand until a fine precipitate has settled out, adding a filtering aid to the solution, separating the clear liquor from the bulk of the insoluble matter, acidifying the solution to precipitate casein and recovering the casein so precipitated.

HENRY V. DUNHAM.